Dec. 18, 1973   L. F. PAHL ET AL   3,780,198
SYSTEM FOR CARBONATING BEVERAGES
Filed June 7, 1971   3 Sheets-Sheet 2
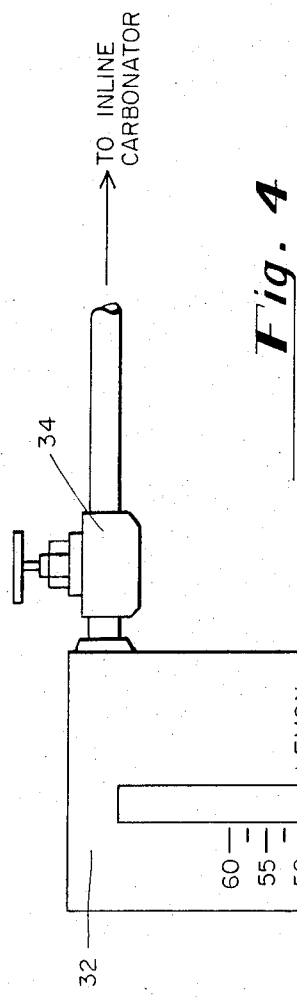
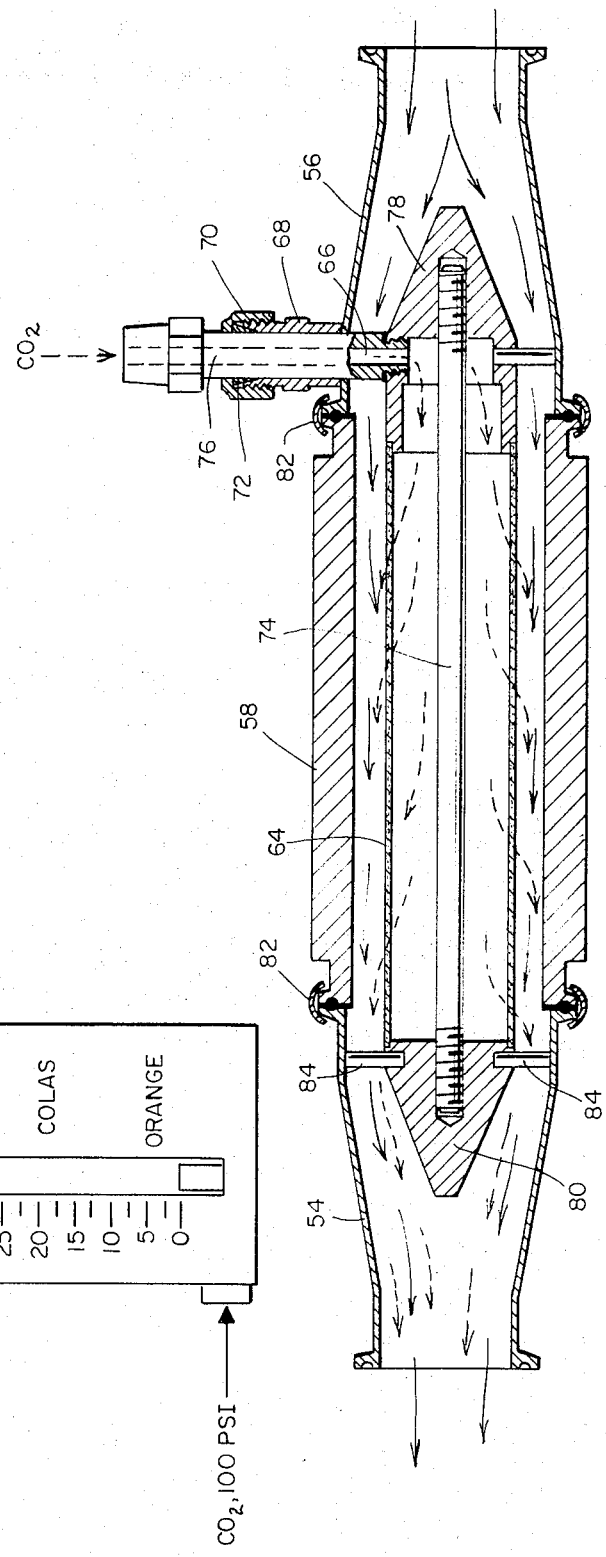

United States Patent Office 3,780,198
Patented Dec. 18, 1973

3,780,198
SYSTEM FOR CARBONATING BEVERAGES
Leo F. Pahl, Pasadena, and Norman H. Jones, Baltimore, Md., assignors to Crown Cork & Seal Company, Inc., Philadelphia, Pa.
Filed June 7, 1971, Ser. No. 150,379
Int. Cl. A23l 1/00
U.S. Cl. 426—477
22 Claims

ABSTRACT OF THE DISCLOSURE

In-line carbonation of beverages in a system comprising a blender, a cooler and a filler. A carbon dioxide diffusion-type injector located in the line between the blender and filler diffuses carbon dioxide into the blended beverage while the beverage flows through the injector at a substantially uniform flow rate. The injector comprises a microporous tubular member.

BACKGROUND OF THE INVENTION

Field of the invention

This invention relates to the production of beverages, and more particularly, to the carbonation of blended beverage ingredients.

The conventional production of beverages or soft drinks involves the blending of beverage ingredients including syrup and water in a predetermined ratio for a particular beverage. By varying the syrup and the ratio, different beverages may be produced utilizing the same blender.

The blended ingredients then enter a cooler where they are distributed and cascaded over cooling plates located above a resevoir. By providing a level sensing mechanism in conjunction with the reservoir, the level of the resevoir may control the output from the blender to assure an appropriate supply of blended ingredients. Usually, the cooler contains an atmosphere of carbon dioxide at low pressure, about 1 p.s.i., to prevent any air from entering the beverage ingredients.

The blended and cooled ingredients are now ready for carbonation. The carbon dioxide within a beverage varies with the particular beverage specified and can range from one volume of carbon dioxide ($CO_2$) gas to four volumes or more with 3½ volumes representing the average. It is very important that the level of carbonation be met for a particular beverage within the tolerances permitted by the industry's quality control laboratories. In most cases, this is a plus or minus 0.1 volume of the required carbonation level and the required carbonation level must be maintained throughout a production run. Once carbonation has been completed, the beverage is dispensed into suitable containers at a filler.

In general, beverages are difficult to carbonate since the product may become wild or foamy after carbonation and therefore difficult to handle in the filler. If the product is wild, considerable losses in beverage may occur at the filler which is extremely undesirable from an economic and sanitation standpoint. The wildness of a beverage is not only a function of the volume of carbon dioxide added to the beverage but also a function of the sugar content and type of beverage itself. For example, lemon-lime drinks and ginger ales both contain three and one-half volumes of carbon dioxide. However, lemon-limes are prone to become much more wild than ginger ales. In short, beverages are much more difficult to carbonate than water.

The prior art

The carbonation of beverages has been accomplished in the industry by carbonating within a large holding tank located between the cooler and the filler. Carbonation within the holding tank has been achieved by one or more of three methods: injection, atomization, and absorption. Regardless of the particular method utilized in achieving carbonation, the pressure within the tank has been held at approximately 50 p.s.i.

Carbonation within the holding tank has presented a number of problems. First, the tank is very costly since the tank must withstand a pressure of at least 50 p.s.i. (pounds per square inch). When this fact is coupled with the practice of utilizing stainless steel for sanitation reasons, it will be readily appreciated that the cost of carbonation in the holding tank becomes extremely high. Even when stainless steel is utilized, the cleaning of the tank including spray nozzles and film plates when necessitated by a beverage change within the system is very difficult. Furthermore, the cleaning time of the holding tank which represents a down-time for the system is a considerable expense in itself.

In addition to the foregoing problems associated with carbonating in the holding tank, considerable difficulty has been encountered in the prior art in maintaining the proper carbonation level. As a result, numerous and continuous adjustments of the carbonating equipment have been required to meet a specified carbonation level for the particular beverage. The 50 p.s.i. holding tank has also resulted in high filling pressures. These pressures not only render filling difficult but are hard on the filler since a pressure seal greater than the 50 p.s.i. between the filler and the container must be achieved (normally 5 p.s.i. greater than the filler bowl pressure). Where cans are being filled the tops of the cans may actually be deformed during filling.

A somewhat different carbonation technique has been utilized in the beer industry in the form of in-line carbonation through a porous stone. However, in-line carbonation is only utilized to trim the carbonation level of the beer since beer contains a certain amount of carbon dioxide as a by-product of fermentation. Accordingly, the amount of carbon dioxide added to the beer is less than a half volume as compared with the one to four volumes added to beverages. A small amount of carbonation will not render the beer wild or difficult to handle during filling although the greater amount of carbonation required for beverages can. In any event, a brewery must utilize a large holding tank independent of carbonation which affords ample opportunity for the beer to stabilize.

Furthermore, the brewery utilizes a constant flow of beer which facilitates in-line carbonation since the injection of a constant stream of carbon dioxide may be utilized to achieve an appropriate carbonation level. Finally, the brewery is not faced with a change of products as the beverage industry is and therefore is not faced with the cleaning problems associated with the change of products. The porous stone utilized in the in-line carbonation does not therefore present a substantial cleaning problem to the beer industry although ultrasonic cleaning is required on a periodic basis. Frequent ultrasonic cleaning of the porous stone necessitated by changes in product in a beverage system could render in-line injection as costly as the present carbonation method of the beverage industry.

SUMMARY OF THE INVENTION

It is one object of this invention to reduce the cost of carbonating beverages.

It is another object of this invention to improve sanitation in the carbonation of beverages.

It is a further object of this invention to provide a carbonating system for beverages which is easily cleaned.

It is a still further object of this invention to achieve specified levels of carbonation in beverages with a high degree of accuracy.

It is also an object of this invention to achieve a specified level of carbonation without requiring numerous and continuous manual adjustments.

It is an additional object of this invention to permit filling of beverages at a low pressure.

In accordance with these and other objects of the invention, a beverage carbonating system is provided including a blender for blending beverages ingredients including water and syrup, a cooler for cooling the blended ingredients, and a filler for filling containers with the blended and cooled ingredients. Carbonation is achieved with an in-line carbonation injector located in the line between the cooler and the filler.

In accordance with one aspect of the invention, the injector comprises a stainless steel tube having closed ends located in the beverage stream. Carbon dioxide is diffused from the inner surface, through the porous tube to the outer surface over which the beverage stream flows.

In accordance with another aspect of the invention, the pressure at the injector is substantially greater than the pressure at the filler. Although the injection pressure for the carbon dioxide may be greater than 40 p.s.i., the pressure at the filler will not exceed 35 p.s.i.

In accordance with another aspect of the invention, a stabilizing chamber is located between the injector and the filler to provide sufficient time for the carbon dioxide to dissolve into the beverage before the beverage reaches the filler. The internal pressure of the stabilizing chamber may also be maintained at the pressure less than 40 p.s.i.

In accordance with another aspect of the invention, the rate of flow of carbon dioxide into the injector is controlled by the flow of the beverage ingredients through the system. By providing a flow control means starting and stopping the flow of carbon dioxide to the injector in response to the on-off condition of a pump supplying the beverage ingredients, a more uniform carbonation level may be achieved. In addition, a flow control means may include means for automatically maintaining the flow of carbon dioxide to the injector at a preset level.

BRIEF DESCRIPTION OF THE DRAWINGS

FIG. 3 is a sectional view of the carbon dioxide injector shown in FIG. 2;

FIG. 4 is an enlarged schematic diagram of a portion of the carbon dioxide flow control mechanism shown in FIG. 1.

DETAILED DESCRIPTION OF A PREFERRED EMBODIMENT

Figure 1:
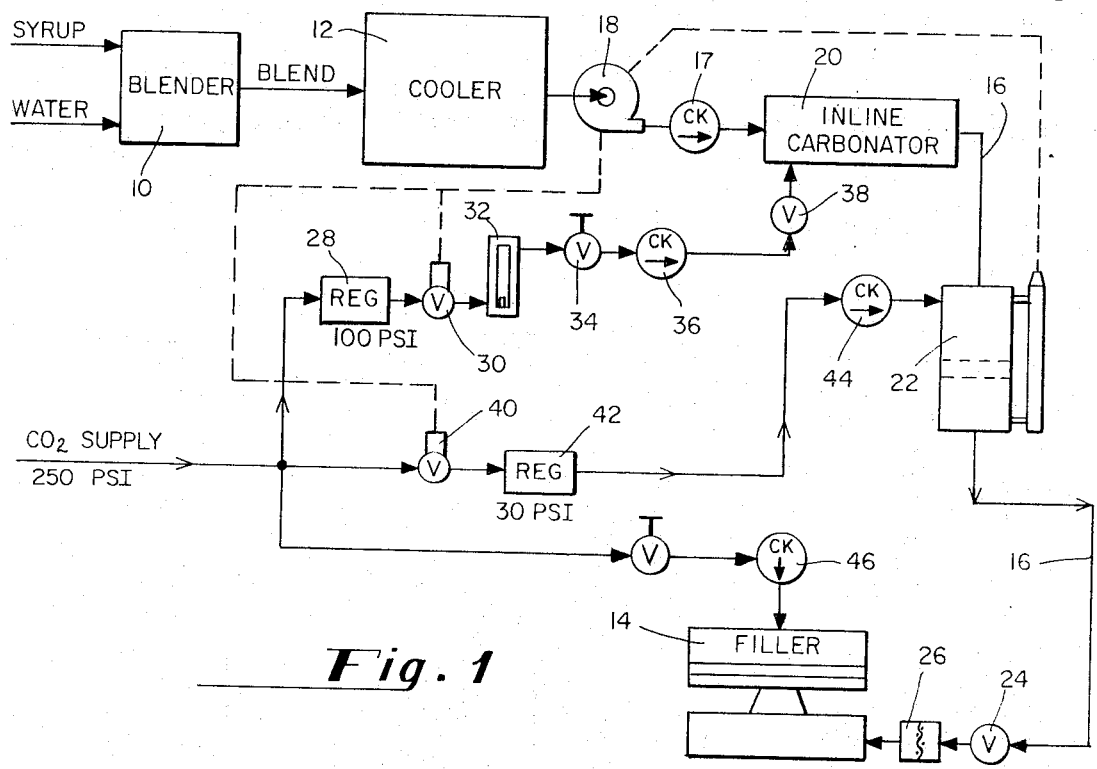
FIG. 1 is a schematic diagram of a carbonation system embodying the invention.

The system for making beverages shown in FIG. 1 comprises a blender 10 such as the Crown Sure-Blender manufactured by the assignee of this invention which blends a particular syrup and water in some predetermined ratio to meet the production requirements for a particular beverage. Prior to entering a blender 10, the water may be deaerated so as to minimize the air content of the water. The blended beverage contents are then passed through a cooler unit 12 such as the Crown Sure-Cooler manufactured by the assignee of this invention. In the cooler 12, the blended beverage ingredients are cascaded over sanitary cooling plates and collected in a reservoir which may have a level sensing mechanism to control the output from the blender 12. The blended and cooled beverage ingredients are now ready for carbonation.

In accordance with this invention, carbonation is achieved in the line connecting the cooler 12 with a filler 14. As the blended and cooled beverage contents are moved through a line 16 including a check valve 17 by a pump 18, carbonation is achieved at an in-line carbonator 20 which is supplied with a controlled flow of carbon dioxide. The pump used should have some type of capacity control so as to control the pump discharge to the exact ounces per minute required by the filler.

Since the dissolving of carbon dioxide into the beverage ingredients may proceed at a somewhat slow rate, a stabilizing chamber 22 is also provided in the line 16. In effect, the fluid flowing through the chamber 22 is delayed in reaching the filler 16 a sufficient length of time to permit the carbon dioxide to dissolve in the beverage ingredients before filling. The carbonated beverage ingredients are then passed through a valve 24 and a strainer 26 to the filler 14. The head space of the stabilizing chamber 22 and the filler 14 are also supplied with carbon dioxide.

Carbon dioxide enters the system from a suitable supply at a pressure of 250 p.s.i. One branch provides carbon dioxide to the in-line carbonator 20 at 100 p.s.i. maintained by a regulator 28. Carbon dioxide then passes through a solenoid valve 30, which is open-and-closed automatically depending upon the on-off state of the pump 18, and into a flow meter 32 which will be described in somewhat further detail in FIG. 4. Once a suitable flow rate has been determined for the particular beverage being produced, a needle valve 34 is set in the appropriate position to supply carbon dioxide to the in-line carbonator 20 through a check valve 36 and a valve 38. The carbon dioxide applied to the in-line carbonator 20 is maintained at a pressure greater than 40 p.s.i. with 50 p.s.i. being preferred in most cases.

Another carbon dioxide branch including a solenoid valve 40, which is automatically opened and closed in response to the on-and-off state of the pump 18, and a regulator 42 for maintaining the carbon dioxide head in the stabilizing chamber 22 at a substantially lower pressure than 40 p.s.i., preferably 30 p.s.i. A check valve 44 is also provided in this branch.

Figure 2:
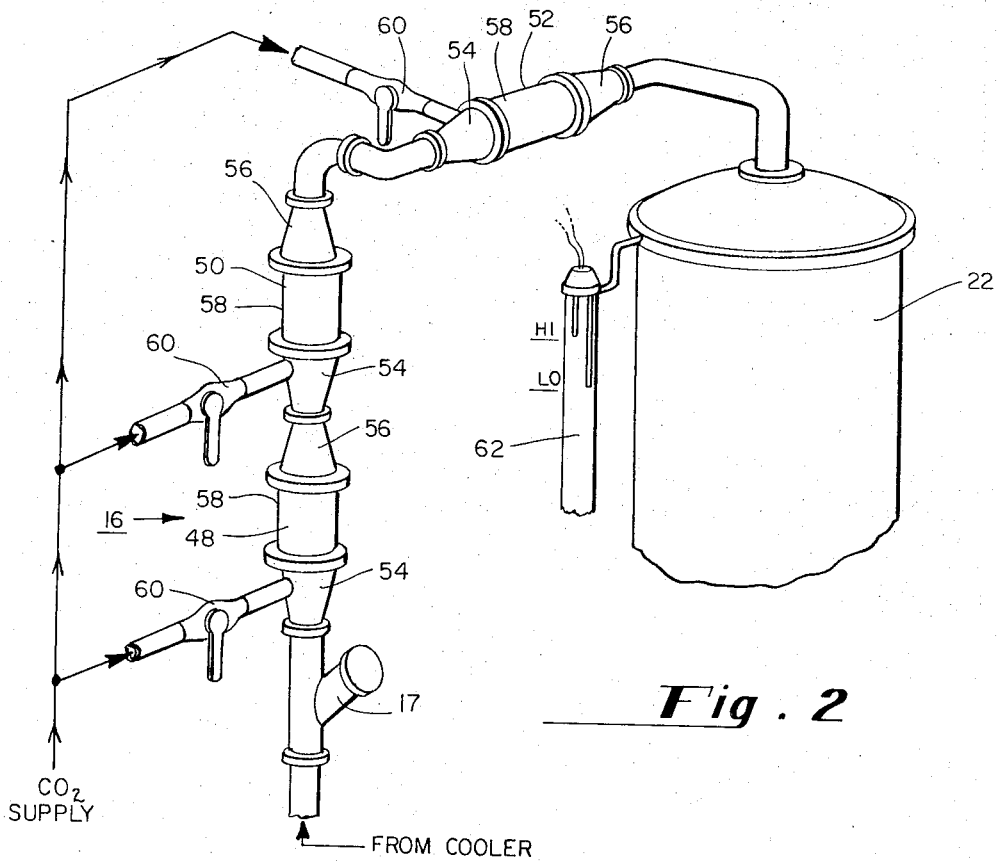
FIG. 2 is a perspective view of the carbonation subsystem for the system of FIG. 1.

The carbonation subsystem will now be described in somewhat more detail with reference to FIG. 2. As shown there, a plurality of carbon dioxide, diffusion-type injectors 48, 50, and 52 are arranged in series in the line 16. Each injector comprises reducing ferrules 54 and 56 and a central transparent housing member 58 to permit observation of the carbon dioxide injection supplied at carbon dioxide inlets 60 located in the reducing ferrule 54.

Once the carbon dioxide enters the injectors 48, 50 and 52, the carbon dioxide is diffused into the beverage stream as will be subsequently described with reference to FIG. 3, the carbonated beverage passes to the stabilizing chamber 22 which may comprise an enlarged portion of the line 16. By providing a level sensing mechanism 62 along the side of the chamber 22 as shown in FIGS. 1 and 2, the pump 18 may be actuated in response to the level within the stabilization chamber 22. Of course, solenoid valves 30 and 42 respond to turn the flow of carbon dioxide on and off with the flow of beverage ingredients as controlled by the pump 18.

The injectors 48, 50 and 52 will now be described in somewhat more detail with reference to FIG. 3 wherein the sectional view reveals a microporous stainless steel tube 64 through which carbon dioxide is diffused. Carbon dioxide enters through an inlet 66 which extends through the reducing ferrule 56 and is sealed therewith. A suitable collar 68 and locking cap 70 which engages the ears 72 on the inlet tube 76 is provided. The inlet tube 76 extends into a bullet-shaped plug 78 which closes one end of the tube 64. A similar plug 80 is provided at the other end of the tube 64 with a rod 74 joining and holding the plugs 78 and 80 in place. Carbon dioxide as indicated by the broken arrows diffuses from the interior tube surface, through the pores, to the exterior tube surface over which the beverage ingredients are flowing as indicated by the solid arrows.

It has been found that the stainless steel tube 64 with its micropores having a diameter of 100 microns permit small carbon dioxide gas bubbles to be diffused and absorbed by a thin liquid film of beverage ingredients which covers a large contact area provided by the outer surface of the tube 64. The thin film immediately receives full carbon dioxide saturation even at the lowest possible carbon dioxide flow rate thereby reducing foaming at the filler 14.

In order to provide for better stabilization of the beverage after injection; i.e., provide for carbon dioxide bubble collapse with absorption into the beverage liquid and the separation of the carbon dioxide bubbles which do not collapse, the stabilization tank 22 is provided. These bubbles which are produced by the diffusion of carbon dioxide through the microporous tube 64 also create a turbulence which assures more uniform distribution of dissolved carbon dioxide within the beverage liquid as compared with prior art methods of carbonation.

The time required to carbonate a beverage stream flowing over the outer surface of the tube 64 depends upon the bubble size. Small bubbles will provide high transfer rates thereby necessitating lesser periods of stabilization. It has been found that where the tube 64 comprises micropores having a diameter of 100 microns, the stabilization tank may be sufficiently large to provide a delay of 10 seconds before the carbonated beverage reaches the filler 14. It is of course possible to provide the stabilization within the filler 14 itself by providing a sufficiently large storage chamber within the filler thereby eliminating the stabilizing chamber 22. It will be noted that the carbon dioxide pressure within the chamber 22 and the filler 14 are almost identical anyway thereby providing nearly the same condition for stabilization. (Filler bowl pressure approximately 2 to 7 p.s.i. less than stabilization tank pressure. This differential in pressure is necessary to transfer the carbonated beverage in the stabilization tank which is usually located at a lower elevation level with relation to the filler bowl without the use of a transfer pump.) Of course, this pressure is substantially lower than the injection pressure so as to lower the cost of the stabilizing chamber regardless of location and facilitate filling of containers.

Referring again to FIG. 3, it will be seen that the housing member 58 is secured in place by clamps 82 which permit the member 58 to be removed. As mentioned previously, the member 58 is transparent to permit observation of the diffusion process within the injector. Note that the flow or velocity of the beverage liquid through the injector is substantially uniform since the cross-sectional area of the beverage slip-stream over the outer surface of the tube 64 is substantially identical to the cross-sectional area of the line 16. Thus a truly in-line injection is provided without accumulation or retardation of the beverage flowing through the line 16 ahead of the stabilization chamber 22. FIG. 3 also reveals pins 84 which are inserted into plugs 78 and 80 to achieve the proper spacing of the tube 64 within the housing member 58.

The flow meter 32 in combination with the manually set needle valve 34 shown in FIG. 1, provide a single adjustable control for establishing the rate of flow of carbon dioxide into the in-line carbonator 20 which may comprise one or more injectors. As best shown in FIG. 4, the needle valve 34 may be set to correspond with the amount of carbon dioxide required for the particular beverage being produced. Note the scale extending from 0 to 60 on the flow meter which is a representation of the carbon dioxide flow in cubic feet per minute. In reading the scale, it will be seen that orange drinks typically require the rate of flow of 5 cubic feet per minute to achieve an appropriate carbonation level where the pump 18 is supplying beverage liquid at a rate of approximately 4700 gallons per hour. Similarly, colas requires 20 cubic feet per minute, ginger ales 30 cubic feet per minute and lemon-limes 45 to 50 cubic feet per minute. These flow rates are typical only. They depend upon (a) the quantity of beverage being pumped through the system, (b) the degree of carbonation required for the particular beverage prepared, (c) chemical characteristics of the particular beverage being prepared, (d) the temperature at which the particular beverage is being prepared. By adjusting the needle valve 34 until the ball or float in the indicator reaches the appropriate flow rate indication for the particular bevarage being produced, the level of carbonation required for the particular beverage at a set flow rate may be readily adjusted and accurately controlled.

It has been found that not only must the rate of flow of carbon dioxide be varied depending upon the particular beverage being produced and the filler capacity, the number of injectors utilized must also be varied to achieve appropriate carbonation levels without rendering the beverage wild and foaming. For example, it has been found that colas require one injector having a total carbon dioxide flow rate into the stream of beverage liquid of at least 20 cubic feet per minute. On the other hand, ginger ales and lemon-limes require 2 injectors and 3 injectors having a total carbon dioxide flow rate of 30 and 50 cubic feet per minute respectively. Thus the system shown in FIG. 2 having 3 injectors might well be required to appropriately carbonate lemon-limes during this period. However, the cola could be properly carbonated utilizing just one of the injectors shown in FIG. 2. Of course, colas and ginger ales could also be carbonated utilizing 3 injectors although 3 injectors would not be necessary.

Figure 5:
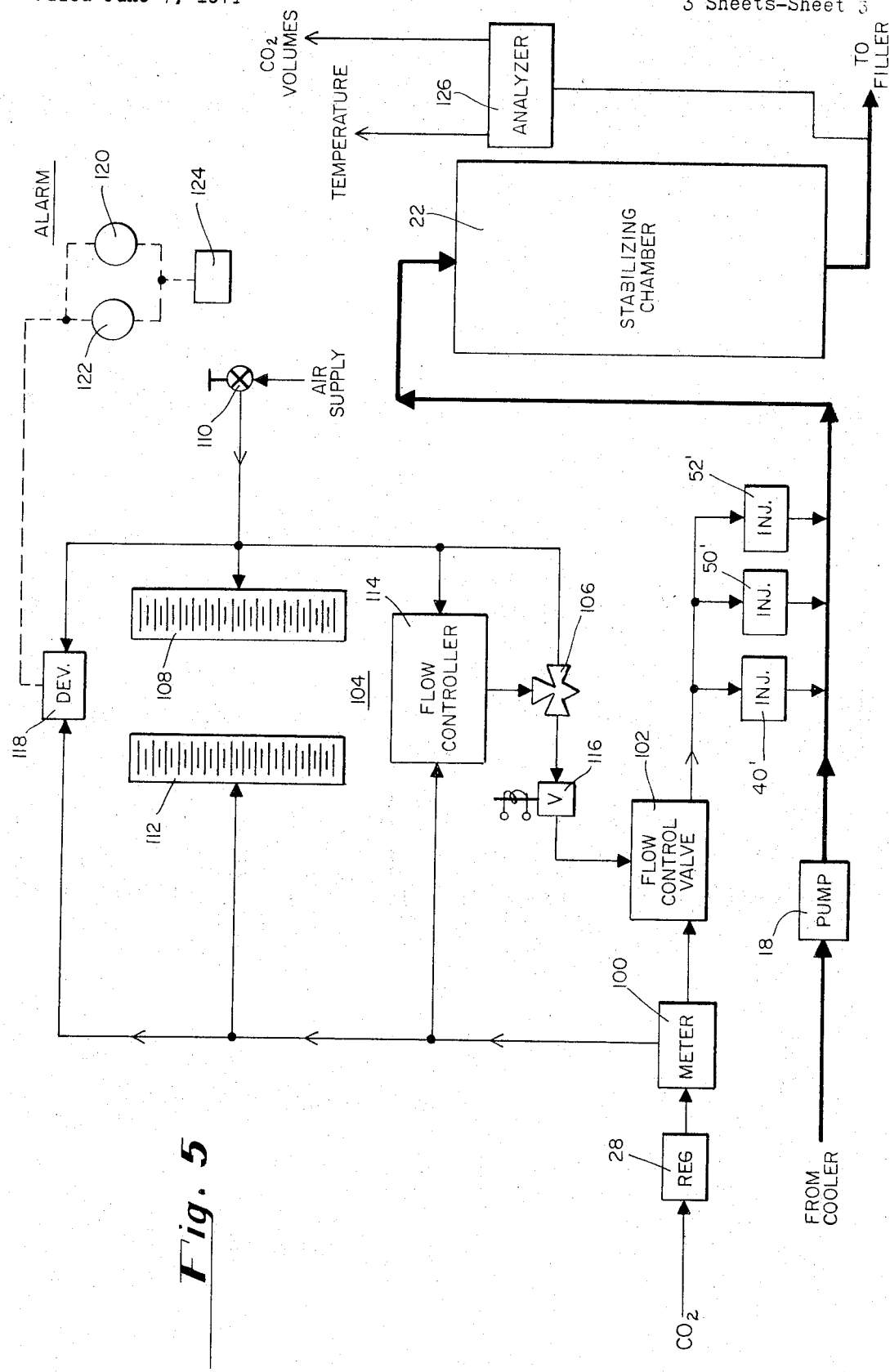
FIG. 5 is a schematic diagram of a control system for automatically maintaining a pre-set rate of flow of carbon dioxide.

In describing the control of the carbon dioxide flow rate with reference to FIGS. 1 and 4, it has been assumed that the flow rate remains constant having once been set manually by the needle valve 34. This is not necessarily the case where the carbon dioxide supply itself generates changes in flow rates. FIG. 5 shows a system which will maintain a pre-set flow rate regardless of a change of flow rate at the supply. In such a system, the flow meter 32 and the needle valve 34 are replaced by a self-balancing flow rate control mechanism comprising a flow meter with transmitter 100 in series with a flow control valve 102 which are located in the carbon dioxide line ahead of 3 parallel injectors 48′, 50′ and 52′. The meter and transmitter 100 senses the flow rate of carbon dioxide and this rate is then compared with the pre-set rate by a pneumatic circuit 104 which in turn adjusts the flow control valve 102 to raise or lower the flow rate to match the pre-set rate.

The operation of the pneumatic control circuit 104 will now be described with reference to FIG. 4. Initially, an operator positions a selector switch 106 in the automatic position and then appropriately adjusts the set point on the set point scale 108 by adjusting a valve 110 coupled to an air supply. A set point signal varying from 3 to 15 p.s.i. is then generated which is proportional to the desired rate of flow of carbon dioxide. A carbon dioxide flow rate pneumatic signal generated by the meter and transmitter 100 which also varies from 3 to 15 p.s.i. may be read on the flow scale 112.

The flow rate signal and the set point signal are now compared at the flow controller 114 to determine if the actual flow rate matches the set point. If there is an error between the flow rate and the set point, an output signal is generated by the flow controller 114 and applied to the flow controller 102 through the switch 106 and a solenoid valve 116 which is responsive to the on-off state of the pump 18 or the level in the stabilizing chamber 22. If any problem occurs to cause the rate of flow of carbon dioxide to change, the flow controller 114 will sense the change and produce an output which will vary accordingly to reposition the flow control valve 102.

An alarm system is also provided which utilizes a differential pressure switch 118 responsive to the set point signal and the flow rate signal. Any difference in either of these signals will cause the pressure switch to close and operate an audible alarm 120 or a warning light 122. The alarm may also actuate a time delay mechanism 124 which shuts down the system to prevent the loss of any beverage.

By setting the switch 106 to the manual position, the set point valve 110 may be utilized to control the flow of carbon dioxide to the injectors 48′–52′ manually in much the same manner as the flow meter 32 and the check valve 34.

An analyzer 126 such as the Taylor x600A may be provided to analyze the carbon dioxide volumes and the temperature at the output of the stabilizing chamber 22. The same analyzer may be utilized to automatically adjust the set point of carbon dioxide flow. Such an analyzer would assure constant monitoring of carbon dioxide volumes in the beverage and enable the operator to reset the point of the carbon dioxide control system if improper carbon dioxide content is noted. Appropriate alarming connected to the analyzer responsive to volumes and temperature signals would provide positive backup indications where a possible unusable product is being processed. In this connection, the analyzer would provide an indication of an improper setting for carbon dioxide injection as well as erroneous variations from the setting.

Although a specific embodiment of the invention has been shown and described, it will be understood that various modifications may be made which fall within the scope of the appended claims.

What is claimed:

1. A system for producing carbonated beverages comprising:
    a blender means for blending beverage ingredients including water and syrup;
    a filler means for filling containers with said beverage ingredients;
    a line connecting said blender means with said filler means; and
    an in-line, diffusion-type carbonation injector means located in said line between said blender means and said filler means for diffusing carbon dioxide into said beverage ingredients while said ingredients flow through said injector means at a substantially uniform flow rate.

2. The system of claim 1 wherein the cross-sectional area of said flow of ingredients through said line is substantially identical to the cross-sectional area of said flow of ingredients through said diffusion means so as to prevent a pressure drop across said in-line diffusion means.

3. The system of claim 1 wherein said injector means comprises a microporous member located in said line such that the said beverage ingredients flow along said member and over a surface thereof, the carbon dioxide being diffused through said microporous member to said surface so as to inject carbon dioxide into said flow beverage ingredients.

4. The system of claim 3 wherein said microporous member is tubular, said beverage ingredients flowing over and along the outer surface of said tubular member, said carbon dioxide being diffused through said tube from the inner surface to said outer surface.

5. The system of claim 4 wherein said tubular member comprises stainless steel.

6. The system of claim 5 wherein said injection means further comprises a substantially transparent housing means juxtaposed to said tube to permit visual inspection of carbon dioxide diffusion.

7. The system of claim 3 further comprising a stabilizing chamber located between said injector means and said filler means, said stabilizing chamber delaying the flow of said beverage ingredients between said injector means and said filler means to permit the carbon dioxide to adequately dissolve in said beverage ingredients.

8. The system of claim 7 wherein carbon dioxide is introduced into said beverage ingredients at said injector means under an injection pressure higher than the internal pressure of said stabilizing chamber.

9. The system of claim 8 wherein said injection pressure is greater than 40 p.s.i. and said internal pressure of said stabilizing chamber is less than 40 p.s.i.

10. The system of claim 3 wherein the carbon dioxide is introduced into said beverage ingredients at said injector means under an injection pressure substantially higher than the pressure at said filler means.

11. The system of claim 10, wherein said injection pressure is greater than 40 p.s.i. and said filler pressure is lower than 40 p.s.i.

12. The system of claim 3 further comprising carbon dioxide flow control means permitting the rate of flow of carbon dioxide to be adjusted depending upon the particular beverage to be produced.

13. The system of claim 12 further comprising a pump means for moving said beverage ingredients through said system, said flow control means including valve means responsive to the on-off condition of said pump means to start and stop flow of carbon dioxide to said injector means.

14. The system of claim 12 wherein said flow control means comprises automatic means for maintaining a preset flow rate of carbon dioxide.

15. The system of claim 3 further comprising a plurality of said injector means in said line between said injector means and said filler means.

16. The system of claim 3 further comprising a cooler means between said blender means and said injector means for cooling the blended ingredients.

17. A system for producing carbonated beverages comprising:
    filler means for filling containers with beverage ingredients;
    a line for passing blended beverage ingredients to said filler means; and
    in-line, diffusion-type carbonation injector means located in said line before said filler means for diffusing carbon dioxide into said blended beverage ingredients while said blended beverage ingredients flow through said injector means at a substantially uniform flow rate.

18. The system of claim 17 wherein the cross-sectional area of said flow of said blended beverage ingredients through said injector means is substantially identical to the cross-sectional area of said flow of ingredients through said line so as to prevent a pressure drop in said injector means.

19. The system of claim 18 wherein said diffusion means comprises a microporous member located in said line such that said beverage ingredients flow along said member and over a surface thereof, the carbon dioxide being diffused through said microporous member to said surface so as to inject carbon dioxide into said flow of beverage ingredients.

20. The system of claim 19 wherein said microporous member is tubular, said beverage ingredients flow over and along the outer surface of said tubular member, said carbon dioxide being diffused through said tube from the inner surface to said outer surface.

21. A method of producing carbonated beverages comprising the steps of:
blending beverage ingredients including water and syrup;
diffusing carbon dioxide into a stream of blended beverage ingredients moving at a substantially uniform velocity, said carbon dioxide being diffused into said ingredients with a pressure greater than 40 p.s.i.;
stabilizing the carbonated beverage ingredients under a pressure less than 40 p.s.i.; and
filling containers with the stabilized beverage ingredients at a pressure less than 40 p.s.i.

22. The method of claim 21 including the step of cooling the blended beverage ingredients before diffusing said carbon dioxide into said stream.

References Cited

UNITED STATES PATENTS

| | | | |
|---|---|---|---|
| 3,256,802 | 6/1966 | Karr | 99—275 |
| 2,870,016 | 1/1959 | Day et al. | 99—79 |
| 3,612,495 | 10/1971 | Copping | 261—Dig. 7 |

OTHER REFERENCES

Jacobs, Carbonated Beverages, 1959, pp. 223–228, 249.

MORRIS O. WOLK, Primary Examiner

S. B. DAVIS, Assistant Examiner

U.S. Cl. X.R.

99—275; 261—Dig. 7, 122

UNITED STATES PATENT OFFICE
CERTIFICATE OF CORRECTION

Patent No. 3,780,198      Dated December 18, 1973

Inventor(s)    Leo F. Pahl, and Norman H. Jones

It is certified that error appears in the above-identified patent and that said Letters Patent are hereby corrected as shown below:

Column 3, line 21, delete "for blending beverages ingredients in-line 22, delete "cluding water and syrup, a cooler for cooling the blended";

line 23, delete "ingredients";

line 24, delete "and cooled";

line 26, after "filler" insert --where the flow of blended ingredients in the injector is maintained substantially uniform--;

line 42, delete "the" and insert --a--.

Signed and sealed this 20th day of August 1974.

(SEAL)
Attest:

McCOY M. GIBSON, JR.      C. MARSHALL DANN
Attesting Officer          Commissioner of Patents